United States Patent [19]

Carlston et al.

[11] 4,436,084

[45] Mar. 13, 1984

[54] PORTABLE PANE MOUNTABLE SOLAR PANEL

[76] Inventors: Jack E. Carlston, 1834 Antisdale Rd., Muskegon, Mich. 49442; Harold W. Johnson, 3337 Jefferson, Muskegon Heights, Mich. 49444

[21] Appl. No.: 303,199

[22] Filed: Sep. 17, 1981

[51] Int. Cl.³ ............................................. F24J 3/02
[52] U.S. Cl. .................................. 126/429; 126/430; 126/438; 126/441; 126/450
[58] Field of Search .................. 126/417, 428–431, 126/434, 436, 438, 441, 444, 449, 450; 52/790

[56] References Cited

U.S. PATENT DOCUMENTS

| | | | |
|---|---|---|---|
| 3,299,591 | 1/1967 | Woelk | 52/790 |
| 3,971,359 | 7/1976 | Bourne | 126/429 |
| 4,046,133 | 9/1977 | Cook | 126/270 |
| 4,050,443 | 9/1977 | Peck et al. | 126/270 |
| 4,073,282 | 2/1978 | Schriefer, Jr. | 126/441 |
| 4,212,288 | 7/1981 | Lipinski | 126/428 |
| 4,279,240 | 7/1981 | Artusy | 126/419 |
| 4,289,120 | 9/1981 | Ward | 126/450 |
| 4,304,220 | 12/1981 | Brockhaus | 126/429 |

FOREIGN PATENT DOCUMENTS 56-44552  4/1981  Japan ................................. 126/429

OTHER PUBLICATIONS

Bruce Anderson *Solar Energy: Fundamentals in Building Design* New York, McGraw-Hill 1977, pp. 96, 97.

*Primary Examiner*—Lee E. Barrett
*Attorney, Agent, or Firm*—Miller, Morriss & Pappas

[57] ABSTRACT

A portable, lightweight solar panel for mounting against window panes which incorporates an array of absorbers, diffusers and flow directors, reflectors, heat storage elements and an automatic flow directing valve. The heat concentrators are corrugated elements located to reflect heat and light from contact with the reflective surface to collectors located in the unit. The collectors or heat storage elements are positioned in the troughs of the corrugated elements and the tubular elements are in stand off relation to receive the parabolic focusing projection of the sun's rays. These units act as heat supplement means for interior space.

6 Claims, 6 Drawing Figures

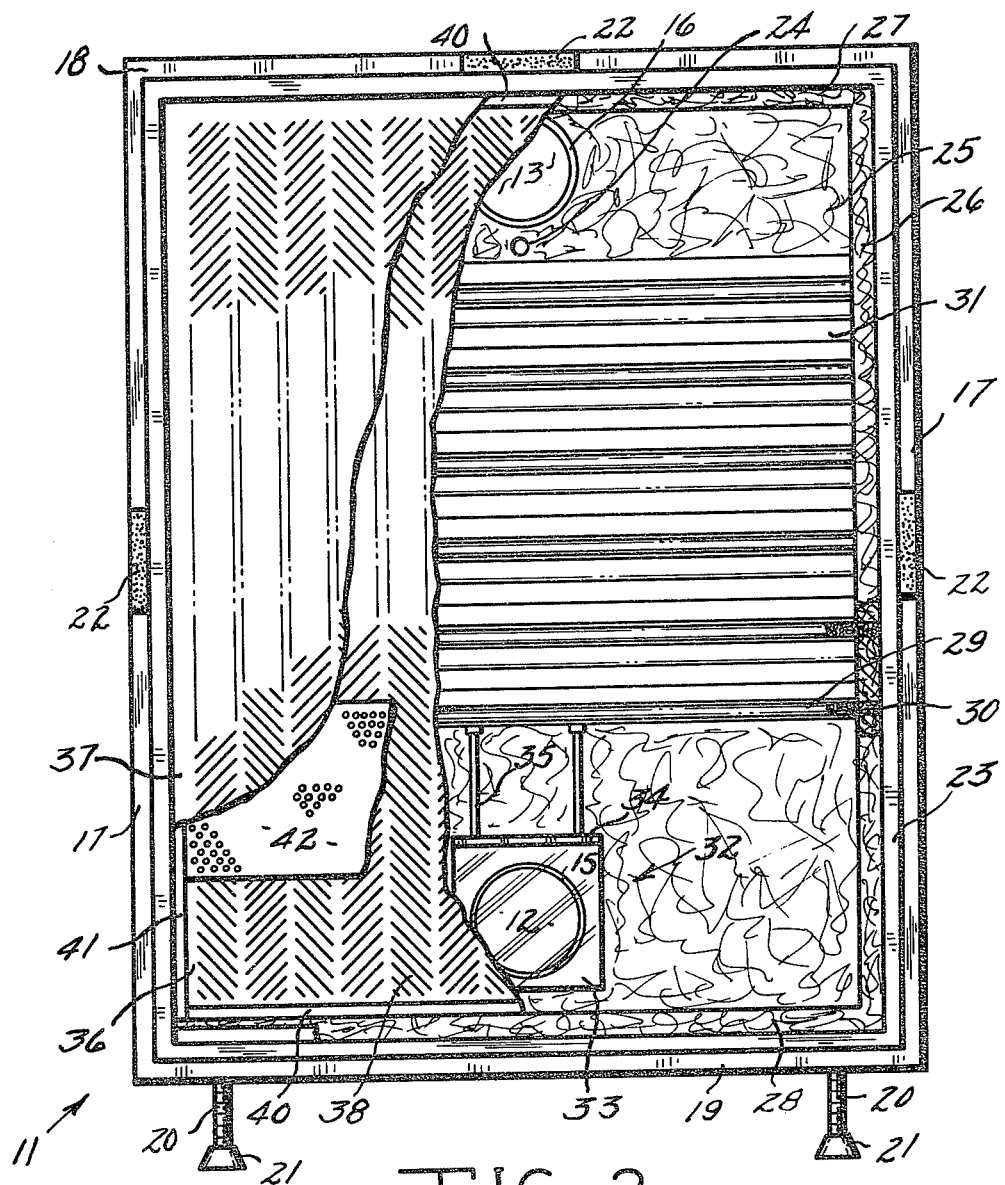
FIG. 2
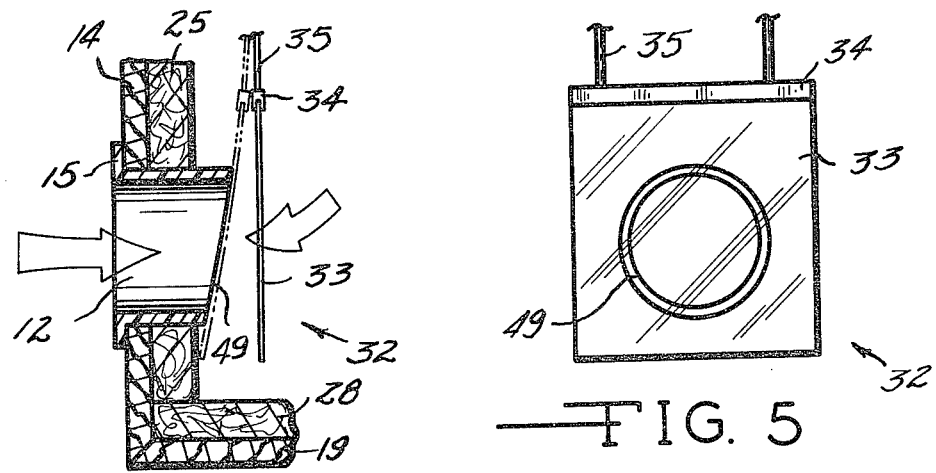
FIG. 4
FIG. 5

PORTABLE PANE MOUNTABLE SOLAR PANEL

The present invention is directed to an extremely portable solar panel heating unit which is directly applicable to the inside surfaces of transparent windows or door lights or panes. More specifically, the solar panel of the present invention is marginally sealed against the window or door pane at the contact surfaces so that a plurality of absorption, concentration and accumulating means are efficiently activated by the sun's radiation to heat the interior of the panel and to store the residuals of the solar heating process for subsequent release. The solar unit is provided with self-operating unidirectional flow control means so that movement of air is vertical through the solar unit from bottom to top and that upon any reversal of air flow, the air flow is discontinued.

The invention contemplates a plurality of heat absorbing and accumulating means arranged effectively within a shallow frame which is open on the front face for perimeter sealing against a selected window pane or door pane. In such a positioning there is adjustability in the base or frame to advantageously locate the unit in the window or door against the transparent glass. The shallow frame is fully insulated and at the back of the unit is a lower opening or port and an upper opening or port. As the thermal conditions within the unit rise beyond the ambient room temperatures, air commences to flow into the bottom of the unit and out of the top of the unit to diffuse into the served living space. The air is warmed above the room temperature by the absorption of solar energy and the convection air sweep of the heat proceeding in the unit between the transparent or glass surface and the encasement of the frame. This proceeds as long as the solar impingement of rays into the unit through the transparent glass or window cover keeps generating heat at or in excess of the air flow requirements. In the event of a cessation of solar penetration, as in the evening or on cloudy days, the unit stops reversal of air flow thereby preventing currents developing at the interphase between the cold window or door pane and inside air. This dramatically reduces the cascading of cold air into the room until the solar inspired heat exchange restores air flow from bottom to top. The sensitive valve for achieving automatic flow control is a part of the invention along with the arrangement of elements to provide a lightweight, durable and effective solar heating panel with maximized storage of heat so that the flow proceeds well beyond the actual screening of the sun rays. The inner walls and all interior surfaces are black for maximum absorption of sun ray heat except the undulating or corrugated trough concentrator. This is of reflective material such as a metal providing a parabolic-reflector-like focusing of sun rays on all sides of cylindrical or tubular elongate heat absorbers. The achievement of a primary solar radiation collector with secondary radiation means enhanced by absorption cells and valved flow control results in a lightweight and portable solar unit directly applicable is existing living space without structural modification of the living space is the consequence of the present invention. In summer the panel units are easily moved and the windows of the living space are restored to normal function.

Baffle means located in the frame achieves a modulation of flow to provide a maximum diffusion of moving air and the valve means is of a most unique character and construction responding rapidly to reversals in light air flow.

In the paior art, as known, the following references are regarded as most pertinent:

In the U.S. Pat. No. 4,279,240 to Bobby L. Artusy a self-regulating window is provided in which louvered means adjust solar penetration. By contrast, the structure expressed herein does not rely upon regulation of light flow for operative control.

In the U.S. Pat. No. 4,046,133 of Thomas E. Cook a solar panel structure is proposed for heating air flowed therethrough by convection and radiation and is intended for attachment to a wall or roof and where the internal components are corrugated and transparent to provide a venturi-like flow in respect to a ray absorbing rear panel. This structure employs a fan to assure circulation and includes a damper.

The Solar Energy Device and System of John F. Peck and Carl N. Hodges appearing in the U.S. Pat. No. 4,050,443 embraces an enclosure at a window in which parallel slats provide the heat absorbing surface and air is flowed over the surfaces and ducted to a use situs.

The humidity adjusting device of the U.S. Pat. No. 4,212,288 of Vincent B. Lipinski is an attachment to the exterior of a building wall and represents a large class of solar heating structures wholly distinguishable from the portable and window attachment structure of the present invention to the living space interior.

None of these devices anticipate the combination panel structure of applicants for direct application to existing windows and where no additional power is required to pump or flow the air.

Accordingly, it will be appreciated that the present invention is portable, removably attachable to the interior side of existing windows and requires no power in providing a very substantial heat supplement to living space from solar energy sources. Hence, the principal object of the present invention is to provide an economic and efficient portable solar panel structure applicable directly to windows. In the summer the units are easily removed from the windows and then replaced as heat supplement becomes important with the approach of cooler weather.

Another object is to provide a solar panel which is self-regulating and requires no separate power for air circulation.

Still another object is to provide an economically constructed portable or movable unit for maximum utilization of solar energy which is provided with a reverse flow control valve which allows the unit to shut off when energy is stripped from the unit and in prevention of a flow reversal which would otherwise cascade cool air into the living space to be warmed when the residual heat has been stripped therefrom.

Other objects such as construction economy, light weight, and simple assembly characterize the present invention and together with the efficiency of the system assures a heat and energy saving tool to an energy-conscious public.

IN THE DRAWINGS

FIG. 2 is a front elevation partially cutaway view of the solar panel seen in FIG. 1 and revealing the internal elements of the panel.

FIG. 3 is a cross section side elevation view of the solar panel of FIG. 1 and taken on the line 3—3 of FIG. 1 to reveal the corrugated heat concentrating element and the heat accumulating or storage tubes and with the unit resting on the sill of the window and with the unit closed against the window pane. The valve is shown in the open position.

FIG. 4 is a detail cross section elevation view as in FIG. 3 and indicating the valve in open position and in phantom line closed position at the lower port.

FIG. 5 is a front elevation view of the valve membrane depending before the lower port sleeve opening.

GENERAL DESCRIPTION

In general, the present invention is a portable solar panel combination which attaches to the inside surface of a glass pane and comprises a shallow open faced frame with marginal closure means allowing the structure to be marginally closed against the glass pane. In the frame is an array of heat accumulating, absorbing, and concentrating means. Automatic flow directing means are also provided in the frame assuring unidirectional flow of air through said frame from bottom to top and in shut off prevention of flow from top to bottom. The flow directing means is a leaf type membrane for maximum sensitivity. The structure is attached to a glass pane such as a window pane so that the sun rays penetrate the glass and impinge upon the surfaces within the frame. The interior surfaces of the frame are black and behind the interior surface is a substantial heat insulation barrier. The insulation barrier assures against conducting heat loss through the frame and serves as a barrier against the cold of the window pane penetrating to the interior of the living space. Between the glass pane and the back barrier of the frame are a plurality of planar open mesh screen accumulators. These are black and act as accumulators since rays impinging upon the louvered surfaces provided by the mesh heat up. A perforate control baffle is also provided running upwardly in the frame for about one-third of the height of the frame. A metallic reflective faced concentrator in undulating or corrugated form provides a plurality of focusing or reflecting troughs which direct sun rays against positioned heat absorber cartridges. The secondary radiation from the reflective corrugated surfaces impact the heat absorber cartridges which are tubes filled with a heat absorbing substance allowing storage of heat and gradual giving up of that heat as the operating cycle suggests. An upper opening is provided through the frame at the top and a lower opening is provided through the frame at the bottom of the frame. The upper opening communicates warmed air through the frame and into the room where the unit is located. The lower opening is closable by valve means and is open when air is flowing into the frame and upwardly within the frame when the heat generated warms the surfaces and develops connection within the units above the ambient temperature of the living space. When generation of heat ceases, the storage accumulators maintain the upward flow until an equilibrium between ambient heat and the heat of the panel unit is achieved. This is achieved by the sensitive valve means of the structures, as will be seen.

SPECIFIC DESCRIPTION

Figure 1:
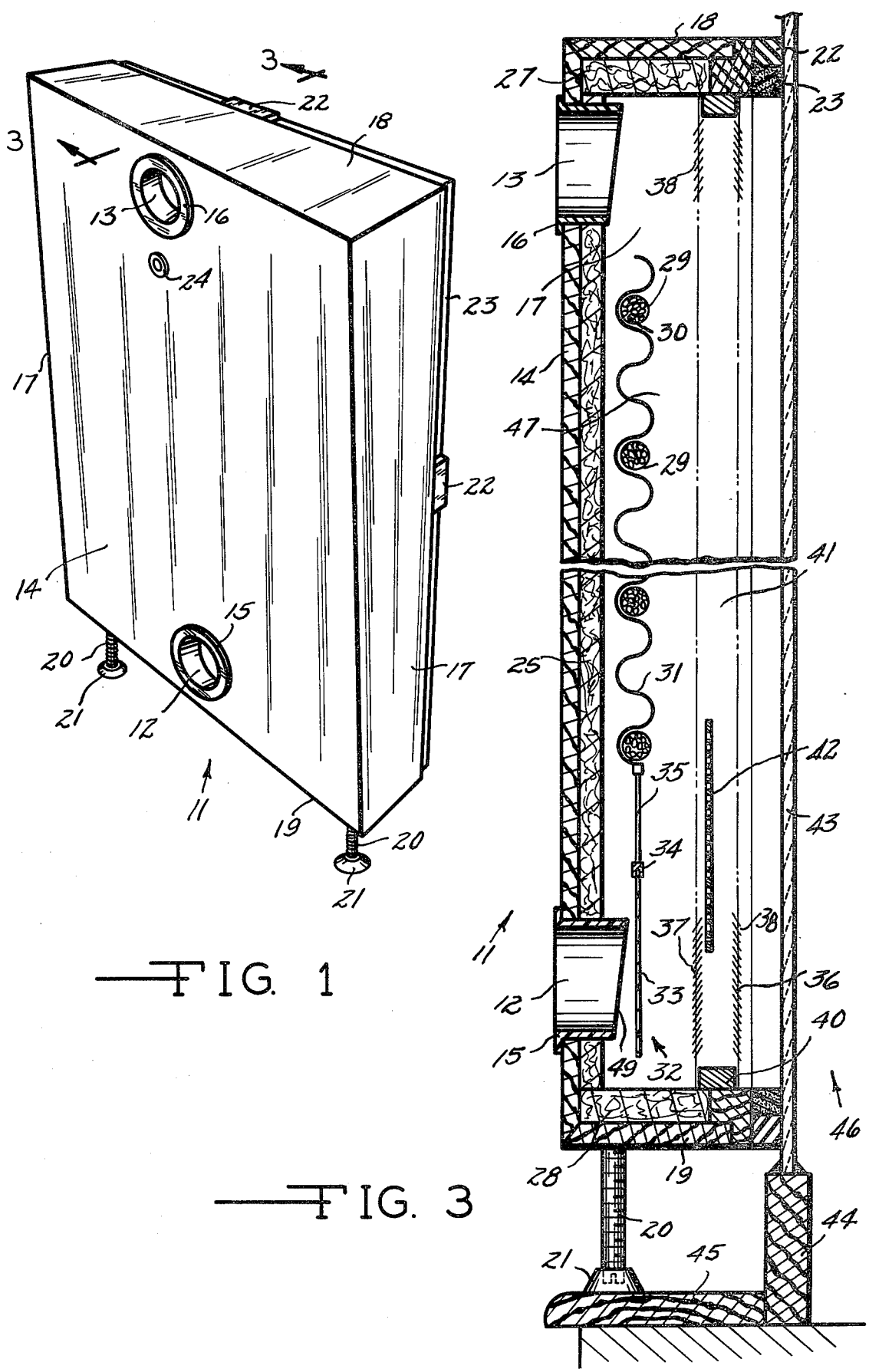
FIG. 1 is a perspective view of the portable solar heating pane structure of the present invention as viewed from the rear and indicating the upper and lower ports and sized to close against a window pane.

Referring to the drawings and with first particularity to the FIG. 1 thereof, the portable solar panel 11 is shown as viewed from the side, top and rear. Two ports 12 and 13 are provided which penetrate the back plate 14. This forms the back of the frame of unit 11. The upper port 13 is a heat diffusing port through which warm air is pumped into the room or interior space served by the solar panel 11. The lower port 12 is an air intake port. Ambient cool air enters the solar panel 11 at the port 12, is warmed and by convection rises through the interior of the solar panel 11 and ultimately exhausts from the unit 11 in heated condition through the port 13. The ports 12 and 13 are formed by flanged tubular sleeves 15 and 16, respectively, fitted in suitably sized openings in the back plate 14. While the ports 12 and 13 are shown as round, other and louvered forms may be used and sized to handle equal volumes of air at identical pressures. The outlet upper port 13 may be choked to accomplish selected air velocity increases at emission of the air into the room. Two side plates 17 are provided which close against the back plate 14 and form the sides of the frame. The top plate 18 also closes on the back plate 14 at right angles thereto and also closes against the upper edges of the side plates 17 and forms the top of the frame. A bottom plate 19 closes against the back 14 and sides 17 and includes height adjusting means as the jackscrew legs 20 on the cushion feet 21 which allows the solar unit 11 to be fitted against the pane of glass in a window or door. This completes the open faced frame of the unit 11. Such a fit against a window pane is accomplished by adhesive blocks 22 at intervals around the perimeter face of the unit 11 and adjacent the face perimeter gasket 23. The gasket 23 is preferably closed cell foam material as rubber or urethane, for example, which provides a pressure seal against a window pane. The adhesive blocks 22 stick to the glass or pane and hold the gasket 23 thereagainst. A thermometer 24, located below the opening 13, probes the thermal condition of the air in the unit 11 at the moment prior to emission. Together with the legs 20, the unit 11 closes against the window pane in a sealed and centered manner. In some instances plural of the units 11 may be located against large panes as desired. The location of the solar unit 11 is selected where the most direct sunlight enters the window. The unit 11 is preferably sized to substantially fill the pane for best results. The trim lines of the unit 11 allows it to be aesthetically camouflaged by decorative drapes or curtains.

In decorator colors, the units 11 are not objectionable in appearance and indeed the finish on the cabinet or case of the unit 11 has an aesthetic impact of home furnishings.

With reference to FIG. 2 the interior of the portable solar unit 11 is better appreciated. Within the frame formed by the back 14, sides 17, top 18, and bottom plates 19 are insulating liner blocks 25, 26, 27 and 28, respectively. These are painted black on the interior face to enhance absorption of energy from sun rays impinging directly or reflectedly thereupon. An insulating block caulk is utilized at all internal joints to form a bead barrier against heat loss through the frame of the unit 11. Supported by the side blocks 26 are thin walled collector tubes 29 which are filled with a good heat absorbing and storage material 30. The most economic absorber is found in packed pebbles and the thin walls of the tubes 29 are painted black and are preferably of good heat conducting metal to carry the heat into the heat storage media 30. A corrugated heat concentrator 31 is also supported between the side blocks 26 and, as will be seen, it is convoluted to provide a parabolic focusing of sun rays on each of the horizontally disposed collector tubes 29. The corrugations of the concentrator 31 are appreciated as in a stand-off backing relation to the plural tubes 29.

Depending from the bottom skirt or edge of the concentrator 31 is a membranous valve 32. The valve 32 comprises a sheet of light gauge resin or plastic film 33 supported by an upper trim strip 34 and suspended on filamentary strands or cords 35. As will be seen, the membrane 33 is movable toward and away from the inner perimeter surface of the sleeve 15 of port 12 in directional control of flow of air through the unit 11.

A pair of expanded metal screens 36 and 37 (flat, ribbed, metal lath) in spaced-apart relation and both painted black provide ray absorption surfaces while allowing movement of rays through the slots 38 thereof. The screens 36 and 37 fill the frame and maintain their spaced-apart planar relation by the black framing strips 40 (horizontal) and 41 (vertical). Intermediate the two planar screens 36 and 37 is a perforate black baffle 42 which serves to modulate air flow from the valve 32 and through the unit 11. The black color assures that the baffle 42 functions as a heat absorbing structure, as well as a flow moderating element. The openings are quite fine through the baffle 42 so as to provide about 47 openings per square inch. The baffle 42 is preferably in metal as, for example, aluminum.

By reference to FIG. 3 the structure of FIG. 2 is seen in position against a transparent window pane 43 and the window frame element 44 and interior sill 45 are indicated somewhat schematically since the windows 46 in which the solar units 11 are placed are frequently of a wide variety or type, i.e. fixed, sash, movable sash, in metal, vinyl, and wood framing and the like. Sometimes the panel units 11 are applied to doors and panel windows of solariums and the like. While the panes 43 are preferably transparent glass, they may be translucent and may be in plastic sheets as is well known in the art. It is highly desirable that the panes 43 provide minimal impedance to the passage of rays of the sun therethrough.

The valve 32 is seen in profile suspended in front of the lower port 12 and the gasket 23 is seen pressed against the pane 43 and thereby creating a pressed closure against the unit 11 with interior space 47 measuring from the pane 43 to the insulating block 25 and containing therebetween the arrangement of heat absorber screens 36 and 37, the baffle 42, the corrugated paraboloid focusing reflective structure 31 carried in the end plates 17 and in spaced light concentrating relation to the collector or storage tubes 29. The tubes 29 are positioned in offset relation in troughs of the convolutions or corrugations in the reflecting structure 31.

As will be appreciated, the jackscrew legs 20 provide an elevation adjustment and supplemental support for the attachment of the unit 11 to the pane 43 and the feet 21 are in rubber or plastic to prevent marring of the sill or other lift supports. Where sills 45 are not available, tables or other supports and lifts are helpful to block the solar unit 11 into installation position with maximum coverage by the sun.

The plastic film or sheet 33 is positioned adjacent the inner end 49 of the tubular sleeve 15 and depends from the corrugated heat concentrators 31 on the cords 35. The valve 32 is shown in the open position allowing air to enter through the lower port 12 into the space 47 in the unit 11 and to rise by convection currents as the air is exposed to the heat within the unit 11 as generated by impingement of the sun's radiation against the exchanger surfaces. This movement allows an efficient pick up of heat by the air as the air rises and is diffused and attenuated by the baffle 42 and the screens 36 and 37, tubes 29 and other interior absorption surfaces in the unit 11. As the air is heated, it expands and is emitted through the upper port 13 through sleeve 16 and into the dwelling or living area served by the unit 11. Such flow continues so long as the thermal conditions within the unit 11 exceed the ambient temperature of the living space. Since the storage units 29 gradually give up their heat, the unit 11 continues to function for some time after the sun ceases to shine and the valve 32 is sensitive to the equilibrium situation where the heat in the unit 11 is at the ambient heat of the living space served. Then, the valve 32 closes in prevention of reversal of flow through the unit 11 which would otherwise cascade increasingly colder air into the living space formerly warmed by the unit 11.

As flow commences to reverse through the unit 11, the unidirectional sensitive valve 32 closes as will be seen and remains closed until the heat in the unit 11 again exceeds that of the ambient living space.

In the FIG. 4 the valve 32 is best understood and incoming cool air is represented entering the lower port 12 through the sleeve 15 and unobstructed by the valve 32 which swings open as shown in full line. The incoming air is indicated by the horizontal flow arrow. Such flow is induced by the convection currents in the unit 11 as it is heated by the sun's rays. Thus, when the unit 11 is heated, flow enters the unit 11 from the bottom and moves upwardly toward the top of the unit 11. As the sun ceases to warm the interior of the unit 11, the unit 11 gradually cools and when the unit 11 is cooler than the ambient air then the valve 32 sensitively picks up the reversal in air flow and snaps closed against the perimeter inner end 49 of the tubular sleeve 15. The slope of the planar truncation forming the perimeter inner end 49 of the sleeve 15 is as shown, at the top commencing closest to the hanging membrane 33 and falling away at the bottom toward the plane of the back insulating block 25. This avoids any fulcruming of the membrane 33 against portions of the end truncation and the flat closure is an effective barrier to reverse flow designated by the curvilinear flow arrow in the FIG. 4. FIG. 5 best expresses the sheet or film membrane 33 suspended from the cords 35 and supported by the channel-like trim strip. The valve requires no outside energy for actuation and is selected from plastic having good surface conforming characteristics and stability at high temperatures. The material selected should be non-brittle and not subject to embrittlement as it ages. Nylon monofilament cords 35 have worked very well.

Figure 6:
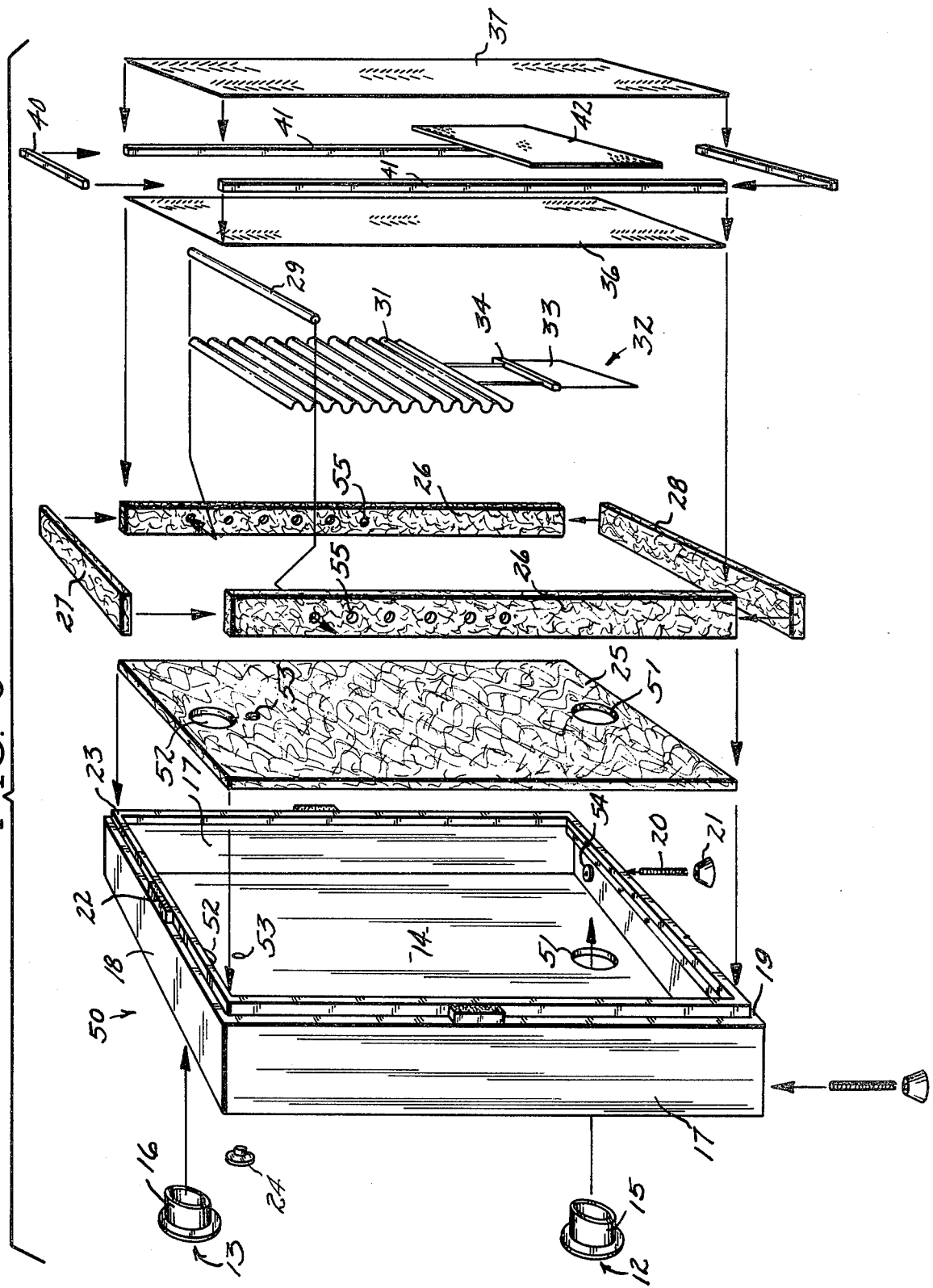
FIG. 6 is an exploded perspective view of the portable solar panel shown in FIG. 1 and indicating the simplicity of construction and assembly.

The FIG. 6 is important to appreciate the ease of manufacture and assembly. The frame 50 is shown assembled and with the marginal gasket 23 and adhesive blocks 22 installed. The frame 50 comprising back 14, sides 17 and upper end 18 and lower end plate 19 includes openings 51 and 52 and opening 53, the latter for penetration of the thermometer 24. The openings 51 and 52 receive the sleeves 15 and 16, respectively, for forming the ports 12 and 13, respectively. Female threaded inserts 54 are pressed through bottom plate 19 to threadably receive the jackscrew legs 20. The insulation block 28 (such as "Thermax") is dropped into the open faced frame 50 and the vertical insulation blocks 26 of the same material with the horizontal blocks 27 and 28 are fitted in place after the tubular absorber collectors are located in the openings 55 in focal adjustment in the parabolic corrugations of the heat concentrator 31 held in place by fastening to the vertical blocks 26. The valve 32 is secured to the bottom of the concentrator 31 by cords 35. Then the final subassembly of spaced-apart screens 36 and 37 marginally secured to the framing strips 40 and 41 and in support of the perforate baffle plate 42 is closed into the open face of the frame 50 completing the solar unit 11. Fastening is preferred using lightweight temperature stable adhesives and with all inner parts coated with a solar absorbing paint, such as flat black. The frame 50 is shallow and box-like and may be made from plastic in plural parts and assembled or it may be made from wood or wood products and is also designed to be injection molded. Attention throughout is devoted to lightweight construction, but with proper attention to durability under the environment of use. Decorator colors in the framing have proved popular.

Various sizes of the units 11 are made and all function and are constructed in accord with this description and function well in a wide variety of environments against window and door panes. By varying the relative sizes of the ports 12 and 13, the flow through the unit 11 may be attenuated in volume and pressure or velocity with selected control over the heat holding features and the optimum operating temperatures. Viewed as a heat supplement, substantial savings have been realized in northern climates.

Having thus described our invention and the preferred embodiment thereof, those skilled in the art will readily perceive improvements, changes and modifications and such improvements, changes and modifications are intended to be included herein limited only by the scope of the hereinafter appended claims.

We claim:

1. A portable window mounted solar panel for attaching to the inside face of a glass pane comprising:
   a shallow box-like frame open on one side and having height adjustable means;
   sealing means on the perimeter edge of the open side of said frame to contact said glass pane;
   at least one upper heat discharge port through said frame;
   at least one lower input port through said frame;
   a plurality of elongate heat absorbers in said box frame;
   a parabolic trough concentrator focusing on each of said heat absorbers;
   a plurality of open mesh baffled heat accumulators in spaced relation to each other and in spaced relation to said absorbers and fully across the open side of said box; and
   automatic means assuring unidirectional flow through said frame from bottom to top.

2. In the combination of claim 1 wherein said sealing means includes gasketing for attachment of said open face of said frame to the inside face of a glass plane.

3. In the combination of claim 1 wherein said automatic means for unidirectional flow comprises a suspended leaf valve closing against said inlet port when said flow through said inlet port reverses.

4. A portable solar panel unit directly applicable to the glass on the inside of a glass pane comprising:
   a frame having a back and four sides, the back having at least one upper opening adjacent the top therethrough and at least one lower opening adjacent the bottom therethrough;
   gasket means on the front faces of said sides;
   adhesive fastening means on at least three of said front faces of said sides for planar attachment to a glass pane;
   adjustable height support means on the bottom side and extendable from said frame;
   insulation lining said frame on the inner faces thereof and said insulation lining secured to said back and said sides;
   a plurality of elongate cylindrical absorbers in spaced-apart parallel planar relation supported by said insulation lining;
   a corrugated parabolic trough concentrator supported by said frame and said insulation lining, said concentrator of high reflective value, said absorbers centered in spaced-apart relation in selected and intermittent of the troughs of said parabolic troughs;
   a plurality of spaced-apart open mesh screen accumulator elements in plane spaced-apart registry with plane surface defined by said absorbers and supported across the open face of said frame;
   a perforate control baffle between said screen accumulator elements and screening up to about one-third of the height of the said frame; and
   valve means in said frame selectively closing flow through said frame from top to bottom and through said openings.

5. In the combination of claim 4 wherein said valve is a suspended thin plastic sheet registering over the lowermost of said openings inside said frame and displaceable to open and close flow through said lowermost opening.

6. In the combination of claim 4 wherein said valve comprises a throat through the lowermost of said opening in said back of said frame and defining a seat within said frame and a thin plastic sheet suspended in said frame in adjacent spaced-apart registry and movable toward and away from closing contact with said seat.

* * * * *